(12) United States Patent
Brueggen

(10) Patent No.: US 8,316,189 B2
(45) Date of Patent: Nov. 20, 2012

(54) RESCINDING OWNERSHIP OF A CACHE LINE IN A COMPUTER SYSTEM

(75) Inventor: Chris Brueggen, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 442 days.

(21) Appl. No.: 12/634,539

(22) Filed: Dec. 9, 2009

(65) Prior Publication Data

US 2011/0138132 A1   Jun. 9, 2011

(51) Int. Cl.
G06F 12/00 (2006.01)

(52) U.S. Cl. .................................... 711/146; 711/141

(58) Field of Classification Search .................. 711/146, 711/141
See application file for complete search history.

(56) References Cited

U.S. PATENT DOCUMENTS

| | | | | |
|---|---|---|---|---|
| 5,913,226 A | * | 6/1999 | Sato | 711/146 |
| 6,493,809 B1 | * | 12/2002 | Safranek et al. | 711/167 |
| 2008/0263239 A1 | | 10/2008 | Brueggen | |
| 2009/0006770 A1 | * | 1/2009 | Blumrich et al. | 711/146 |
| 2010/0211744 A1 | * | 8/2010 | Morrow et al. | 711/128 |
| 2011/0078492 A1 | * | 3/2011 | Kumar et al. | 714/5.11 |

* cited by examiner

*Primary Examiner* — Hashem Farrokh

(57) ABSTRACT

A method of rescinding ownership of a cache line in a computer system includes constructing a table of caching agent representations in which each caching agent representation is accompanied by a validity indicator. The method continues with receiving a cache line sharing list, with each entry of the cache line sharing list indicating the potential ownership of the cache line by one or more caching agent representations that correspond to an entry of the sharing list. The method also includes conveying a snoop packet to a caching agent when the logical conjunction of an entry of the cache line sharing list that corresponds to a caching agent representation and the accompanying validity indicator meets a predetermined Boolean condition.

14 Claims, 2 Drawing Sheets

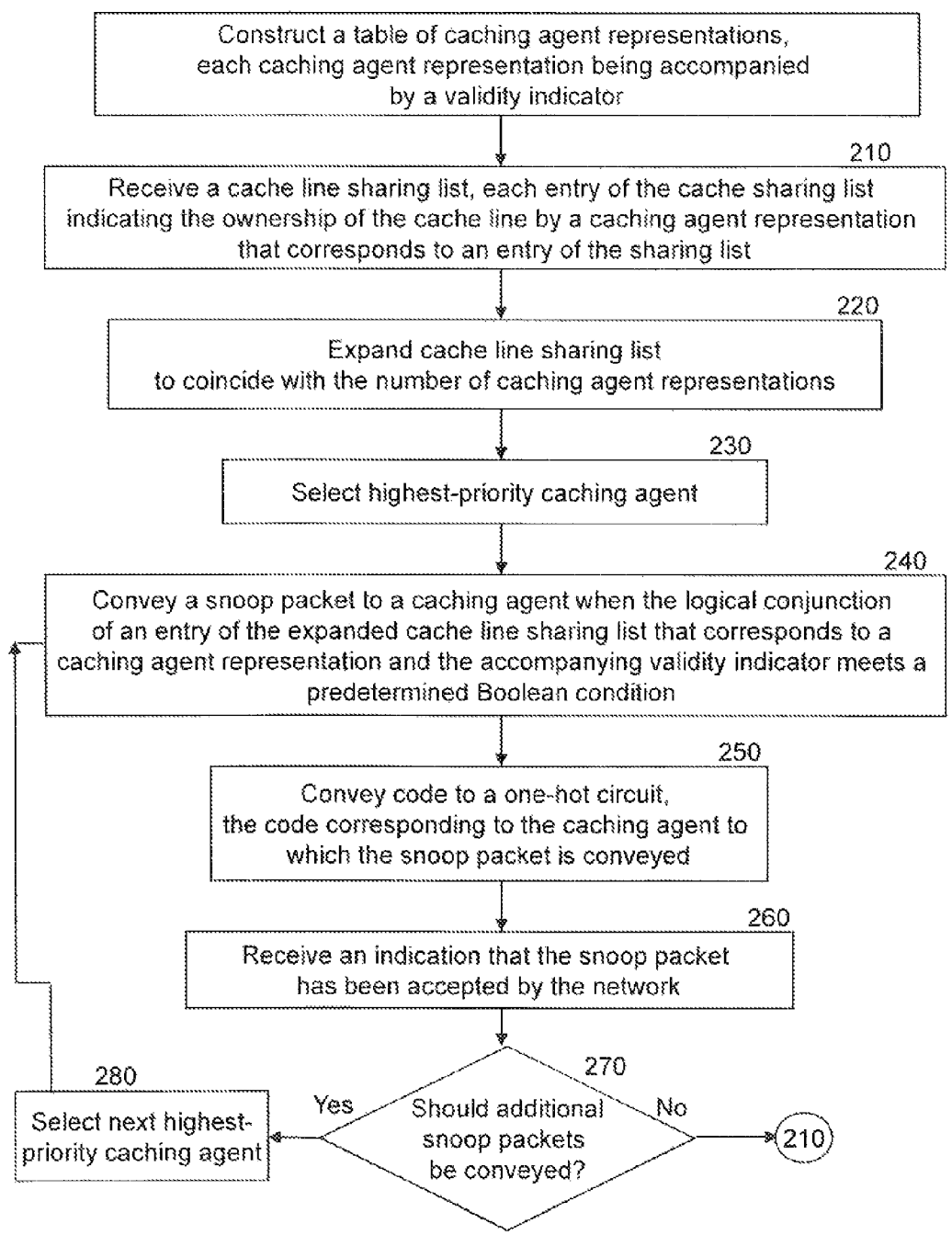

RESCINDING OWNERSHIP OF A CACHE LINE IN A COMPUTER SYSTEM

BACKGROUND

In a multiprocessor computer environment, in which numerous processors might be employed to perform complex computing operations, an individual processor may make use of a memory cache in order to increase the speed of computer operations performed by the processor. By copying frequently used information from a system memory cache into an individual processor's own local memory cache, the time required for the processor to access the cached information is greatly reduced.

However, there are occasions in which a particular processor may need to modify the information stored within the local memory cache. In these instances, the particular processor may update the local memory cache, but may not be permitted to update the memory cache that is under the control of any other processor. Thus, there is a real possibility that one or more of the processors in the multiprocessor environment can operate using an out-of-date copy of the contents of the memory cache. This may cause the computer system to operate unpredictably as each processor carries out instructions using various out-of-date versions of each processor's local memory cache.

In some multiprocessor computer environments, a coherency controller may be used to coordinate changes to the local copies of the memory cache in use by the various processors of the computer system. However, constantly querying each processor to determine whether a particular portion of cached memory is currently being used by the processor can be a task that consumes a significant amount of system resources. Further, there are instances in which a large number of negative responses (indicating that a processor is not using a particular cache line) are received for each affirmative response (indicating that a processor is using a particular cache line) that is received. These time-consuming and inefficient processes can degrade the performance of many high-performance multiprocessor computer environments.

BRIEF DESCRIPTION OF THE DRAWINGS

FIG. 2 is a flow chart for a method of rescinding ownership of a shared cache line in a computer system according to an embodiment of the invention.

DESCRIPTION OF THE EMBODIMENTS

Figure 1:
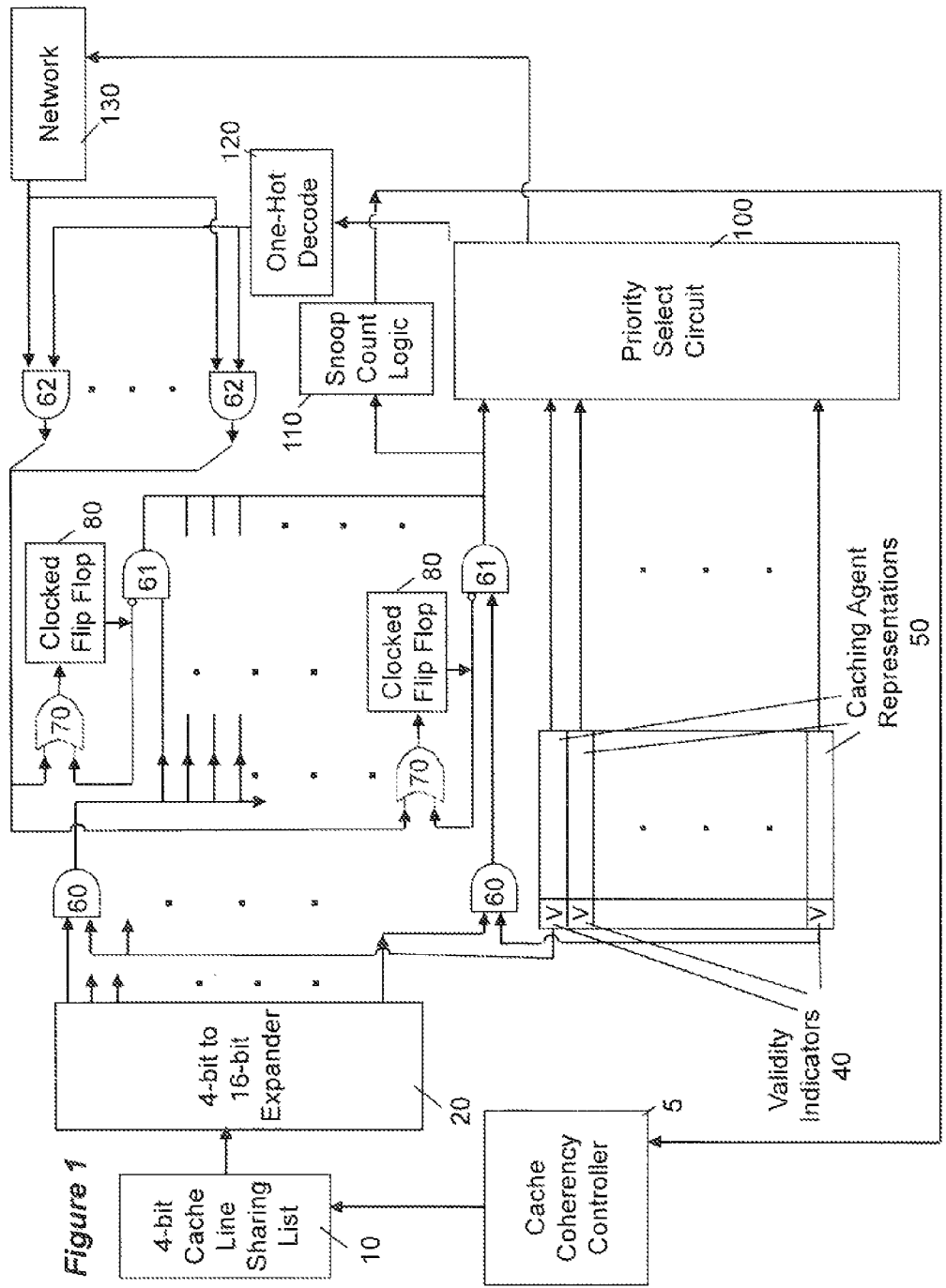
FIG. 1 is a block diagram showing the components of a state machine used to rescind ownership of a shared cache line in a computer system (prior to assigning ownership to a different caching agent) according to an embodiment of the invention.

Some embodiments of the invention include a multiprocessor computer system with the ability to quickly and efficiently rescind and reassign the ownership of the cache lines that constitute the computer system's cache memory. In the example of FIG. 1, a state machine is programmed to transmit or to otherwise convey snoops to the various caching agents that may potentially share ownership of a particular cache line within the computer system. In the context of the claimed invention, a caching agent may be a processor or any other device that controls access to a processor's particular memory cache within the multiprocessor computer system. When the potential owner of a cache line receives a snoop, the potential owner must give up ownership of the indicated cache line and issue a response to that effect, which possibly includes the most recent cache line data.

In the embodiments of the invention disclosed herein, the state machine refrains from issuing snoops to those processors that are known not to share ownership of a particular cache line. This is in contrast to conventional systems in which snoops are dispatched from a coherency controller to a large number of the caching agents in the multiprocessor system. In many conventional systems, snoops are transmitted to caching agents throughout the system regardless of the likelihood of a particular caching agent being in possession of the cache line. This represents an inefficient use of system resources and degrades the overall system performance.

FIG. 1 is a block diagram showing the components of a state machine used to rescind ownership of a shared cache line in a computer system (prior to assigning ownership to a different caching agent) according to an embodiment of the invention. In FIG. 1, there are 4 input lines to and 16 output lines from 4-bit to 16-bit expander 20. There are also 16 validity indicators 40 and 16 caching agent representations 50 that correspond to each validity indicator. Further, there are 16 AND logic elements 60, 61, and 62, along with 16 OR logic elements 70, 16 clocked flip-flops 80, and 16 outputs of caching agent representations 50 coupled to priority select circuit 100. For reasons of clarity, FIG. 1 shows only a representative number of each of the above-identified elements.

In other embodiments of the invention, a 4-bit to 64-bit expander (for example), along with 64 validity indicators, 64 caching agent representations, 64 AND logic elements, 64 OR logic elements, 64 clocked flip-flops, and so forth, may be used. Still other exemplary embodiments of the invention may include a 4-bit to 8-bit expander, 8 validity indicators, 8 caching agent representations, 8 AND logic elements, 8 OR logic elements, clocked flip-flops 80, and so forth.

Returning now to the specific embodiment of FIG. 1, 4-bit cache line sharing list 10 is presented to 4-bit to 16-bit expander 20 by cache coherency controller 5, which may present a unique sharing list for each cache line. In the embodiment of FIG. 1, each bit of the 4-bit cache line sharing list represents a set of caching agents (such as those represented by caching agent representations 50), any or all of which may own a copy of the shared cache line. As mentioned previously, although the embodiment of FIG. 1 makes use of a 4 bit cache line sharing list, other embodiments of the invention may make use of a sharing list that consists of 8 bits, 16 bits, or perhaps a number of bits not evenly divisible by 2, such as an 11 or 15 bit sharing list. However, in each of these alternate embodiments, each bit of the sharing list from cache coherency controller 5 represents a set of caching agents, any or all of which may own a copy of the shared cache line. There are trade-offs related to the choice of sharing list size for any particular system. A large sharing list may perhaps more precisely identify potential owners of a shared cache line, but requires more memory to maintain that record of ownership.

In the embodiment of FIG. 1, 4-bit to 16-bit expander 20 duplicates each bit of the 4-bit list 3 times so that each bit from the 4-bit list is expanded to occupy 4 bits of the 16-bit vector at the output of 4-bit to 16-bit expander 20. In other embodiments of the invention, such as when an 8-bit cache line sharing list is used, expander 20 may duplicate each bit only once so as to occupy 2 bits of the 16-bit vector at the output of expander 20.

Each of the 16 output signal lines from 4-bit to 16-bit expander 20 is conveyed to one of AND logic elements 60. Also conveyed to an input of each AND logic element 60 are validity indicators 40. In the embodiment of FIG. 1, 16 caching agent representations 50 are used, with each of representations 50 being accompanied by a validity indicator that identifies whether a corresponding one of the caching agent representations is valid. Although each caching agent representation 50 is accompanied by or at least associated with a single-bit validity indicator, other embodiments of the invention may make use of validity indicators that include 2-bit identifiers, 4-bit identifiers, and so forth. The inventor contemplates that caching agent representations 50 are explicit addresses of the various caching agents that comprise a multiprocessor computer system.

Each of the 16 outputs from 4-bit to 16-bit expander 20 is conveyed to 1 of the 16 AND logic elements 60 along with one of the 16 validity indicators 40. The resulting, combined output of the 16 AND logic elements 60 is a 16-bit vector in which each bit represents the logical conjunction of a single-bit entry of the expanded sharing list that corresponds to one of caching agent representations 50 and the validity indicator associated with the caching agent representation. The output of each AND logic element 60 is presented to an input a corresponding one of AND logic elements 61. Also presented to AND logic element 61 is the negated output from each of clocked flip-flops 80. The result is that the 16-bit vector that constitutes the output of each of AND logic elements 60 is presented at an input of priority select circuit 100.

In the embodiment of FIG. 1, priority select circuit 100 operates in a manner similar to that described in US20080263239 "Priority Selection Circuit", published Oct. 23, 2008. Upon presentation of the 16-bit vector to priority select circuit 100, the caching agent representation corresponding to the highest priority bit is used to form a first snoop packet. Substantially concurrent with forming the first snoop packet, priority select circuit 100 outputs a code that indicates which one of caching agent representations 50 is being selected. Snoop count logic module 110 then records that a first snoop packet has been transmitted by the state machine of FIG. 1.

When the first snoop packet is transmitted by priority select circuit 100 for acceptance by network 130 (which may include network switches, routers, servers, and a host of other components) priority select circuit 100 also transmits a unique code to one-hot decode circuit 120. When one-hot decode circuit 120 receives the code from priority select circuit 100, one-hot decode circuit 120 converts the code to a 16-bit word in which a single bit of the word is set to a logic "1", with all other bits set to logic "0". Each bit of the 16-bit word is then presented to one of AND logic circuits 62.

When a logic "1" is received from network 130, indicating the acceptance by the network of the first snoop packet from priority select circuit 100, an input of all AND logic elements 62 is set to logic "1". In response to one of AND logic elements 62 having both inputs set to logic "1", the output of the appropriate one of AND logic elements 62 is set to logic "1". Consequently, a logic "1" is presented to the appropriate one of OR logic elements 70. When a logic "1" is presented to one of OR logic circuits 70, the corresponding one of clocked flip-flops 80 changes an output state. When the output state of the appropriate one of clocked flip-flop 80 changes, the output of the clocked flip-flop is set to a logic "1". This results in a logic "0" being presented at an input of the AND logic circuit 90 as the negated value of the output of a corresponding one of clocked flip-flop 80.

With the highest priority snoop packet having now been transmitted from the state machine of FIG. 1, snoop count logic module 110 (which keeps track of the remaining snoop packets to be transmitted by the state machine for a given cache line) is decremented by 1 and priority select circuit 100 conveys a snoop packet to the second highest priority caching agent. This causes a second unique code to be conveyed to one-hot decode circuit 120. When one-hot decode circuit 120 receives the code from priority select circuit 100, one-hot decode circuit 120 converts the code to a second 16-bit word in which a single bit of the word is set to a logic "1", with all other bits being set to logic "0". Each bit of the 16-bit word is then presented to one of AND logic elements 62. Upon acceptance of the snoop packet by network element 130, a second input to all of AND logic elements 62 is set to logic "1". In turn, this causes a second one of OR logic circuits 70 to present logic 1 to each one of clocked flip-flops 80. When the output of each clocked flip-flop is set to logic "1", this results in a logic "0" being presented at an input of AND logic circuit 90 as the negated value of the input of a corresponding one of clocked flip-flop 80.

The above-identified process continues until a cycle is reached in which the vector representing the snoop packets to be issued has only one bit remaining. This case is detected by snoop count logic circuit 110 (snoop <2). When snoop count logic 110 detects that the state machine is operating on its final cycle, the logic module outputs an appropriate signal to cache coherency controller 5 that informs the controller that the state machine can begin processing the cache line sharing list for the next cache line. At this point, cache coherency controller 5 may begin preparing a second 4-bit cache line sharing list pertaining to the next cache line for which ownership is being transferred. Prior to processing any sharing list, the clocked flip-flops 80 are all cleared (state forced to logic '0'). The logic associated with this clearing operation is not shown in FIG. 1.

A feature of the state machine of FIG. 1 is that for those outputs of 4-bit to 16-bit expander 20 that are logic "0", none of the outputs of AND logic elements 60 coupled to these outputs from expander 20 are set to logic "1". Accordingly, with a logic "0" at the input to AND logic elements 61, the output of these elements also remain at logic "0". Further, when validity indicators 40 are set to logic "0" (indicating that the corresponding caching agent representation is invalid), none of the outputs of AND logic elements 60 that receive these of validity indicators are set to logic "1". Accordingly, with a logic zero at the input to AND logic elements 61, the output of these logic elements will also remain a logic "0". Thus, given that AND logic circuits 60 output a logic "1" only when both inputs are "1", it can be seen that the state machine of FIG. 1 avoids transmitting snoop packets to invalid caching agents and to caching agents known not to share ownership of a particular cache line.

It should be noted that although the state machine of FIG. 1 makes use of validity indicators that assume logic "1" when an accompanying one of caching agent representations 50 is valid, nothing prevents implementing validity indicators that assume logic "0" when the accompanying caching agent representation 50 is valid. Further, although the state machine of FIG. 1 makes use of AND logic elements 60, 61, and 62, and OR logic elements 70, nothing prevents implementing NAND and NOR logic elements provided the state machine is programmed to accommodate and to respond correctly to these alternate logic elements. Thus, in a more general sense, the state machine of FIG. 1 could be programmed to respond to any predetermined Boolean condition, such as True (which might be logic "1") or False, which might be logic "0" at the output of logic elements 60, 61, 62, and 70.

FIG. 2 is a flow chart for a method of rescinding ownership of a cache line in a computer system according to an embodiment of the invention. Although the apparatus of FIG. 1 could be used to perform the method of FIG. 2, nothing prevents the method from being performed using alternatively configured state machines, logic modules embodied in software, firmware, and so forth. Additionally, although the flowchart of FIG. 2 suggests a particular order of the steps that constitute the method, it should be understood that other embodiments of the invention may perform the steps in a different order.

The method of FIG. 2 begins at step 200 in which a table of caching agent representations is constructed. Each caching agent representation is accompanied by, or at least associated with, a validity indicator that indicates whether or not the caching agent is valid. In one embodiment of the invention, the caching agent representations are explicit processor or memory controller identifiers within a multiprocessor computing environment. The method continues at step 210 in which a cache line sharing list is received. The cache line sharing list is contemplated as being a digital word in which each bit corresponds to one or more caching agents in the multiprocessor environment.

In one embodiment of the invention, the cache line sharing list of step 210 consists of a 4-bit word in which each bit corresponds to 4 caching agents which are tracked as a group when ownership of the cache line is shared. In other embodiments of the invention, the cache line sharing list may consist of a larger-sized word such as an 8, 16, or 32 bit word. Further, each bit of the cache line sharing list may correspond to fewer than 4 caching agents. In still other embodiments of the invention, each bit of the cache line sharing list may correspond to more than 4 caching agents.

At step 220, the number of entries of the cache line sharing list is expanded to coincide with the number of caching agent representations. In the embodiment of FIG. 2, the cache line sharing list received in step 210 is 4 bits wide and then expanded to a 16-bit word. However, in other embodiments of the invention, the cache line sharing list may consist of a digital word that is larger or smaller than 4 bits and is then expanded to a digital word larger or smaller than 16 bits.

The method continues at step 230 in which the highest priority caching agent is selected perhaps through the use of a priority select circuit such as circuit 100 in FIG. 1. The method then proceeds to step 240 in which the logical conjunction of an entry in the cache line sharing list and the validity indicator associated with a caching agent representation is determined perhaps through the use of an AND logic element. Depending on a predetermined Boolean condition of the logical conjunction (such as logic "1", or "0") a snoop packet is conveyed to the particular caching agent represented by the caching agent representation.

At step 250, a code pertaining to the highest priority caching agent selected in step 230 is conveyed to a one-hot decoder. The code causes the one-hot decoder to generate a code in which a single bit of a digital word output from the one-hot decoder is set to logic "1". In other embodiments of the invention, a "one-cold" decoder may be used. In this embodiment, all outputs of the one-cold decoder are set to logic "1", with a single output being sent to a logic zero.

The method of FIG. 2 proceeds at step 260 in which an indication that the snoop packet conveyed in step 240 has been accepted by the network. In some embodiments of the invention, the indication received from the network is a logic "1", while in other embodiments of the network, logic "0" conveys that the snoop packet has been received. In either instance, the network provides some indication that the snoop packet has been received by at least one network element (i.e., a router, a switch, server, and so forth).

At step 270, a decision is made as to whether additional snoop packets pertinent to the selected cache line need to be conveyed to one or more caching agents. In some embodiments of the invention, step 270 may be accomplished by detecting that fewer than 2 snoop packets should be conveyed to caching agents in the computer system by decrementing the count of snoop packets from a larger to a smaller number. In other embodiments of the invention, the decision of step 270 may be accomplished by incrementing the count of snoop packets (from a smaller to a larger number) that are to be conveyed to the pertinent caching agents.

If the decision of step 270 indicates that there are additional snoop packets that should be conveyed to selected caching agents in the computer system, the method returns to step 280 in which the next highest priority caching agent is selected perhaps by a priority selecting circuit, such as priority selecting circuit 100 of FIG. 1. If, however, the decision of step 270 indicates that there are no more snoop packets to be conveyed to the network from the state machine, the method returns to step 210 in which a new cache line sharing list is received from the coherency controller.

In some embodiments of the invention, only a subset of the method of FIG. 2 is performed. For example, an embodiment of the invention may involve step 200, which includes constructing a table of caching agent representations, each caching agent representation being accompanied by a validity indicator, step 210, which includes receiving a cache line sharing list, each entry of the cache line sharing list indicating the potential ownership of the cache line by one or more caching agent representations that correspond to an entry of the sharing list, and step 240, which includes conveying a snoop packet to a caching agent when the logical conjunction of an entry of the cache line sharing list that corresponds to a caching agent representation and the accompanying validity indicator meets a predetermined Boolean condition.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method of rescinding ownership of a cache line in a computer system, comprising:
    constructing a table of caching agent representations, each caching agent representation being accompanied by a validity indicator;
    receiving a cache line sharing list, each entry of the cache line sharing list indicating the potential ownership of the cache line by one or more caching agent representations that correspond to an entry of the sharing list;
    selecting a highest priority caching agent; and
    conveying a snoop packet to the selected caching agent when the logical conjunction of an entry of the cache line sharing list that corresponds to a caching agent representation and the accompanying validity indicator meets a predetermined Boolean condition.

2. The method of claim 1, wherein the predetermined Boolean condition is True.

3. The method of claim 1, further comprising expanding the number of entries of the cache line sharing list to coincide with the number of caching agent representations in the table of caching agent representation.

4. The method of claim 1, further comprising conveying a code to a one-hot circuit, the code corresponding to the caching agent to which the snoop packet is conveyed.

5. The method of claim 4, additionally comprising receiving an indication that the snoop packet has been accepted by a network coupled to the computer system.

6. The method of claim 1, wherein the table of caching agent representations is a table of identifiers of the caching agents.

7. A logic module for rescinding ownership of a cache line in a computer system, comprising:
   logic for reading elements of a table of caching agent representations and for reading a validity indicator associated with each element of the table;
   logic for receiving a sharing list, each entry of the sharing list indicating that one or more elements of the table of caching agent representations corresponding to the entry of the sharing list is a possible owner of the cache line;
   logic for determining a relative priority of a caching agent associated with an element of the table of caching a agent representations;
   logic for determining the logical conjunction of a validity indicator associated with the element of the table of caching agent representations and a corresponding entry of the sharing list; and
   logic for transmitting a snoop packet to the caching agent associated with the element of the table when the logical conjunction meets a predetermined Boolean condition.

8. The logic module of claim 7, further comprising logic for expanding the sharing list so that the number of entries of the sharing list equals the number of elements of the table.

9. The logic module of claim 7, wherein the predetermined Boolean condition is True.

10. The logic module of claim 7, further comprising logic for determining that the snoop packet has been received by a network element.

11. A logic module for rescinding ownership of a cache line in a computer system, comprising:
    means for reading a caching agent representation and an accompanying validity indicator, wherein the caching anent representation is one of a plurality of caching agent representations, and wherein the accompanying validity indicator is one of a plurality of accompanying validity indicators that corresponds to each one of the plurality of caching agent representations;
    means for reading an entry of a cache line sharing list, the entry of the cache sharing list indicating potential ownership of the cache line by the caching agent representation; and
    means for transmitting a snoop packet to a caching agent that corresponds to the caching agent representation when the logical conjunction of the entry of the cache line sharing list and the validity indicator signifies a True condition.

12. The logic module of claim 11, further comprising means for expanding the entry of the cache line sharing list to coincide with more than one caching agent representation.

13. The logic module of claim 11, further comprising means for receiving a signal that indicates the acceptance of the snoop packet by a computer network.

14. The logic module of claim 11, further comprising means for selecting the highest priority caching agent.

* * * * *

UNITED STATES PATENT AND TRADEMARK OFFICE
CERTIFICATE OF CORRECTION

PATENT NO. : 8,316,189 B2
APPLICATION NO. : 12/634539
DATED : November 20, 2012
INVENTOR(S) : Chris Brueggen Page 1 of 1

It is certified that error appears in the above-identified patent and that said Letters Patent is hereby corrected as shown below:

In column 7, line 23, in Claim 7, after "caching" delete "a".

In column 8, line 10, in Claim 11, delete "anent" and insert -- agent --, therefor.

Signed and Sealed this
Twelfth Day of March, 2013

Teresa Stanek Rea
*Acting Director of the United States Patent and Trademark Office*